(12) United States Patent
Mehas et al.

(10) Patent No.: US 11,495,996 B2
(45) Date of Patent: Nov. 8, 2022

(54) MULTI-COIL PTX/PRX OPERATION AND CONTROL

(71) Applicant: Renesas Electronics America Inc., Milpitas, CA (US)

(72) Inventors: Gustavo Mehas, Mercer Island, WA (US); Changjae Kim, San Jose, CA (US); Nicholaus Smith, La Mesa, CA (US); Pooja Agrawal, Milpitas, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 17/235,207

(22) Filed: Apr. 20, 2021

(65) Prior Publication Data

US 2021/0351620 A1 Nov. 11, 2021

Related U.S. Application Data

(60) Provisional application No. 63/021,027, filed on May 6, 2020.

(51) Int. Cl.
*H02J 50/10* (2016.01)
*H02J 50/80* (2016.01)

(52) U.S. Cl.
CPC .............. *H02J 50/10* (2016.02); *H02J 50/80* (2016.02)

(58) Field of Classification Search
CPC ................................. H02J 50/10; H02J 50/80
USPC ......................................................... 307/104
See application file for complete search history.

(56) References Cited

U.S. PATENT DOCUMENTS

| | | | | |
|---|---|---|---|---|
| 10,063,100 | B2 * | 8/2018 | Singh | ...................... H01F 38/14 |
| 2015/0280322 | A1 * | 10/2015 | Saito | ...................... H02J 50/10 |
| | | | | 343/788 |
| 2017/0054213 | A1 * | 2/2017 | Singh | ................... H04B 5/0081 |
| 2018/0159598 | A1 * | 6/2018 | Ahn | ......................... H01F 5/003 |

\* cited by examiner

*Primary Examiner* — Alfonso Perez Borroto
(74) *Attorney, Agent, or Firm* — Haynes and Boone, LLP

(57) ABSTRACT

According to some embodiments, a wireless power transmitter is disclosed. The wireless power transmitter can include a plurality of transmission coils arranged to cover a charging area and coupled with a ferrite; a plurality of local power controllers, each of the plurality of local power controllers coupled to drive a subset of the plurality of transmission coils, each subset of the plurality of transmission coils including a plurality of the plurality of transmission coils; and a microcontroller unit (MCU) coupled to the plurality of local power controllers, the microcontroller unit including a MCU processor executing instructions to designate states of each of the plurality of transmission coils, the states including active, de-active, and selected for receiver detection, and executing instructions to transmit instructions to each of the plurality of local power controllers in accordance with the state designations.

32 Claims, 9 Drawing Sheets

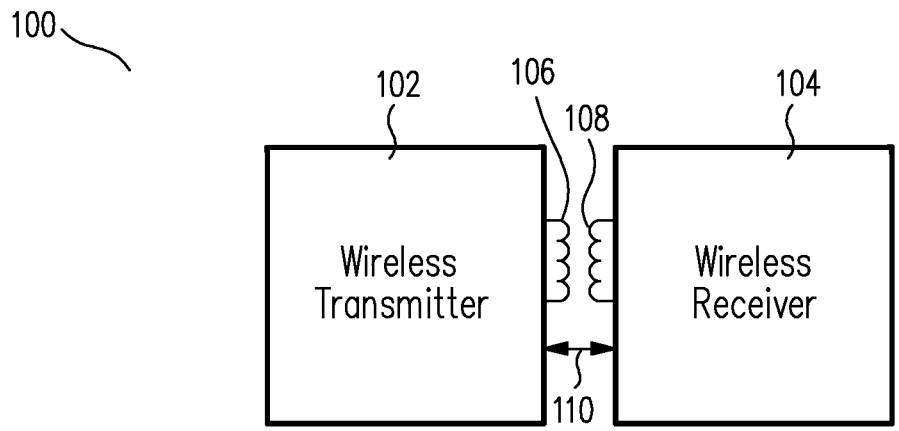
FIG. 1
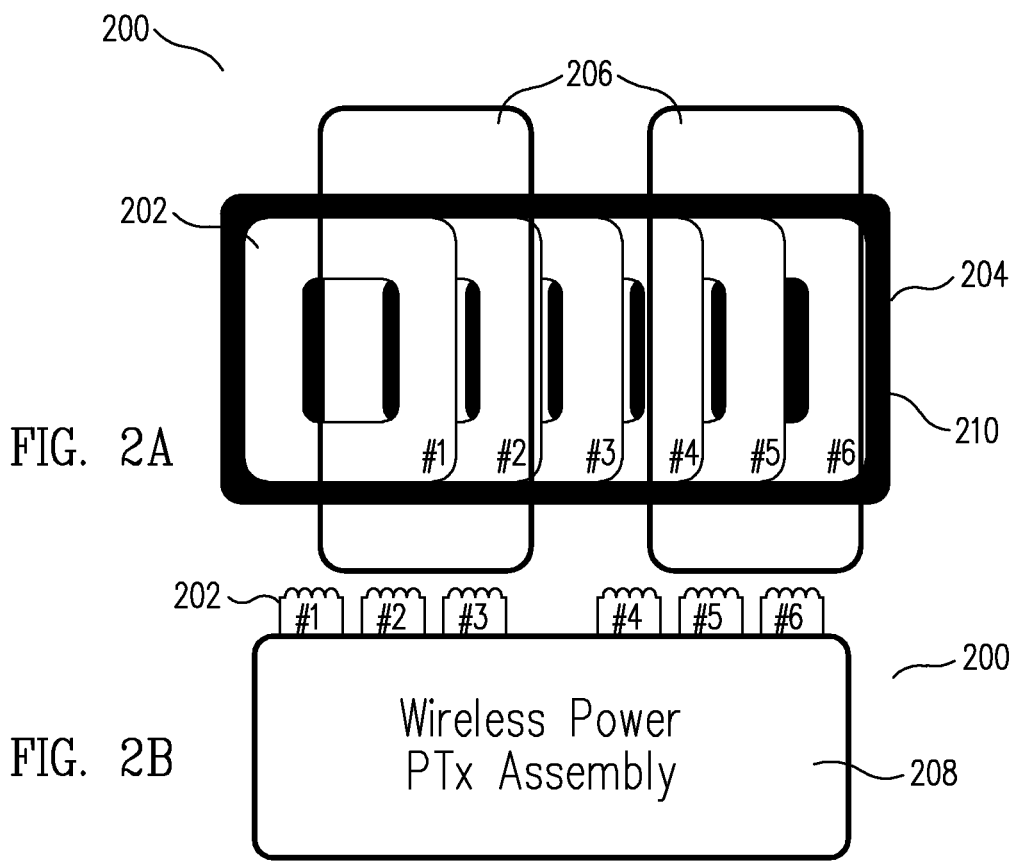
FIG. 2A
FIG. 2B

MULTI-COIL PTX/PRX OPERATION AND CONTROL

RELATED APPLICATIONS

The present disclosure claims priority to U.S. Provisional Application 63/021,027, filed on May 6, 2020, which is herein incorporated by reference in its entirety.

TECHNICAL FIELD

Embodiments of the present invention are related to wireless transmission of power and, in particular, to operating a multi-coil wireless power transmitter in the presence of one or more wireless power receivers.

DISCUSSION OF RELATED ART

Mobile devices, for example smart phones, tablets, wearables and other devices are increasingly using wireless power charging systems. In general, wireless power transfer involves a transmitter driving a transmit coil and a receiver with a receiver coil placed proximate to the transmit coil. The receiver coil receives the wireless power generated by the transmit coil and uses that received power to drive a load, for example to provide power to a battery charger.

There are multiple different standards currently in use for the wireless transfer of power. The most common standard for wireless transmission of power is the Wireless Power Consortium standard, the Qi Standard. Under the Wireless Power Consortium, the Qi specification, a magnetic induction coupling system is utilized to charge a single device that is coupled through the receiver coil circuit. In the Qi standard, the receiving device coil is placed in close proximity with the transmission coil while alternate or amended standards may allow the receiving device coil to be placed near the transmitting coil, potentially along with other receiving coils that belong to other charging devices.

Typically, a wireless power system includes a transmitter coil that is driven to produce a time-varying magnetic field and a receiver coil, which can be part of a device such as a cell phone, PDA, computer, or other device, that is positioned relative to the transmitter coil to receive the power transmitted in the time-varying magnetic field.

Some wireless power transmitters include multiple transmission coils that can be arranged in an area to create larger charging areas. As a receiver is brought close to the transmitter, specific transmit coils may sense and detect the proximity of the receiver as being closer or further and selection of the transmitter coils can be activated and chosen by programming. In some cases, multiple devices can be charged simultaneously in the field created by the multiple transmission coils. However, such an arrangement causes difficult for in-band communications between the multiple receivers and the transmitter.

Consequently, there is a need to develop improved techniques for operating the multiple transmission coils to improve in-band communications.

SUMMARY

According to some embodiments, a wireless power transmitter is disclosed. The wireless power transmitter can include a plurality of transmission coils arranged to cover a charging area and coupled with a ferrite; a plurality of local power controllers, each of the plurality of local power controllers coupled to drive a subset of the plurality of transmission coils, each subset of the plurality of transmission coils including a plurality of the plurality of transmission coils; and a microcontroller unit (MCU) coupled to the plurality of local power controllers, the microcontroller unit including a MCU processor executing instructions to designate states of each of the plurality of transmission coils, the states including active, de-active, and selected for receiver detection, and executing instructions to transmit instructions to each of the plurality of local power controllers in accordance with the state designations.

In some embodiments, the MCU executes instructions to receive communications from one or more of the plurality of local power controllers; analyze the communications to determine presence of a new receiver or removal of a current receiver; if the new receiver is detected, then designate a transmission coil from one of the selected coils to active based on a ping signal strength; and if a current receiver has been removed, then de-activate the transmission coil that was active to accommodate the current receiver; for each active coil in the plurality of transmission coils, designate adjacent coils as de-active; and select each transmission coil that has not be designated as active or de-active for detection of receivers.

In some embodiments, the designated states are configured such that only one transmission coil coupled to each of the plurality of local power controllers can be activated. Further, if one transmission coil coupled to one of the plurality of local power controllers is designated as active, then the remaining transmission coils coupled to the one of the plurality of local power controllers are designated as de-active. In some embodiments, for each transmission coil designated as active, adjoining transmission coils are designated as de-active. Further, transmission coils that are not designated as active or de-active can be selected for receiver detection.

These and other embodiments are discussed below with respect to the following figures.

BRIEF DESCRIPTION OF THE FIGURES

FIG. 1 illustrates a wireless power transmission system.

FIGS. 2A and 2B illustrate a traditional wireless power transmitter.

Figure 3:
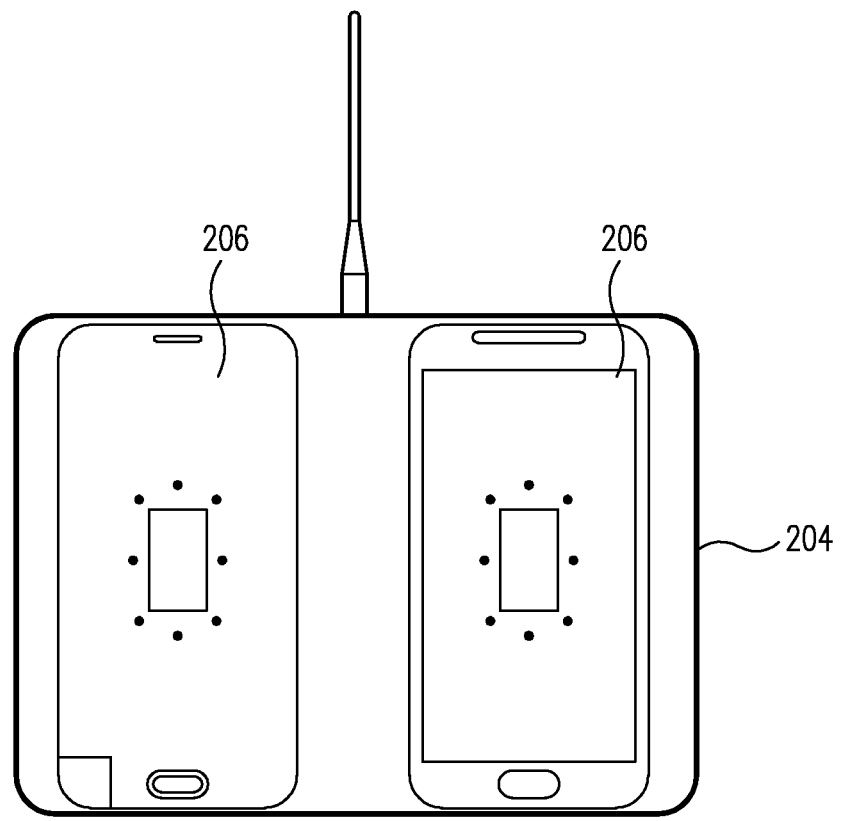
FIG. 3 illustrates charging of two receiver devices with a wireless power transmitter.

These figures are further discussed below in the following detailed description.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

The wireless power transmitter includes a plurality of transmission coils arranged to cover a charging area. A plurality of local power controllers can each be coupled to a subset of the plurality of transmission coils. A microcontroller unit coupled to the plurality of local power controllers. The microcontroller unit executes instructions to turn selected ones of the plurality of coils on or off (an active state or de-active state) and to control detection of wireless power receivers (a selected state of the coils). Wireless power transfer to the detected wireless power receivers brought into proximity with the plurality of transmission coils can be optimized. Further, in-band communications (amplitude shift keyed (ASK) or frequency shift keyed (FSK) communication between the wireless power transmitter and individual receivers) can be performed while reducing signal corruption by setting transmission coils adjacent to active transmission coils to a de-active state.

FIG. 1 illustrates an example wireless power transmission system 100. As illustrated in FIG. 1, a wireless power transmitter (PTx) 102 includes a coil 106 and a wireless power receiver (PRx) 104 includes a coil 108. Coil 106 is driven by PTx 102 to produce a time varying magnetic field that in turn induces a current in coil 108. Coil 108 receives the power into PRx 104 to receive the power transmitted through the time varying magnetic field from PTx 102.

Wireless power receiver 104 can be any device with wireless power functions. Many phones, laptops, tablets, and other devices include a wireless power function. In many cases, these devices can both receive and transmit wireless power. In some examples, wireless transmitter 102 may be a stationary wireless power charger.

Wireless power transmitter 102 and wireless power receiver 104 can exchange data using in-band communications 110 with the wireless power signal between wireless power transmitter 102 and wireless power receiver 104. For example, under the Qi standard wireless power transmitter 102 sends data to wireless power receiver 104 using frequency shift keying (FSK) by modulating the frequency of the wireless power signal. Wireless power receiver 104 can transmit data to wireless power transmitter 106 by amplitude shift keying (ASK) by modulating the amplitude of the wireless power signal 110. Wireless power receiver 104 can, for example, modulate a load on the received power signal to provide amplitude modulation that is detected by wireless power transmitter 102.

Embodiments of the present disclosure include a wireless power transmitter with a plurality of transmission coils. The transmission coils cover an area, over which one or more wireless power receivers can be placed. Such devices include, for example, wireless power transmission pads or other such devices that include an array of transmission coils configured to span an area. The multiple transmission coils can be separated and driven by a plurality of local power controllers, the plurality of local power controllers being controlled by a microcontroller unit (MCU) to reduce interference of in-band communications between multiple receivers placed in proximity to the plurality of transmit coils. In particular, the MCU can control the local power controllers to activate a transmission coil to provide power to a detected receiver and deactivate coils adjacent to the activated transmission coil to prevent interference of in-band communications.

FIGS. 2A and 2B illustrates a wireless power transmitter 200 with a plurality of transmitter coils 202 to transmit power to one or more receivers 206. In the example illustrated in FIG. 1, the plurality of transmitter coils 202 includes six coils labeled coil #1 through coil #6 that span an area 204. As is indicated in FIG. 2A, multiple receivers 206 are arranged over area 204 to receive wireless power transmitted by the plurality of coils 202. Coils 202 may overlap one another, as is illustrated in FIG. 2A, or may be spatially separated throughout area 204. Further, area 204 can include a ferrite 210 to provide flux linkage to the system.

As illustrated in FIG. 2B, the plurality of transmitter coils 202 are driven by a wireless power PTx assembly 208. Wireless power PTx assembly 208 includes circuits and controllers to drive current through each of the plurality of coils 202. Further, PTx assembly 208 includes in-band communications to provide for FSK data transfer to wireless power receivers 206 and receive ASK modulated data from wireless power receivers 206.

Current applications for wireless power transmission increasingly strive for the ability to charge continuously over the entire surface 204 of a given PTx 200. Such applications typically require continuous ferrite 208 under the plurality of coils 202, which results in flux linkage between all coils of the plurality of coils 202.

Current applications also desire the ability to charge multiple PRx 206 in close proximity to each other (Multi-PRx Charging). However, the flux linkage between different PRx 206 can cause in-band ASK communication "Cross Talk" resulting in, for example packet corruption in communications, which causes detrimental operation of wireless power system 200. For example, receiver 206 provides charging information (e.g., requested power levels, charge completion information, etc.) to the wireless power transmitter assembly 208 to control the charging of individual ones of receivers 206.

Charging multiple PRx 206 simultaneous in the QI standard, for example, typically utilizes parallel ASK demodulation methodologies. In this organization, PTx assemblies 208 often utilized multiple PTx assemblies. However, synchronization between two separate PTx assemblies 208 is challenging due to pin limitations on the integrated circuits that typically are included in each of the PTx assemblies 208.

Figure 4:
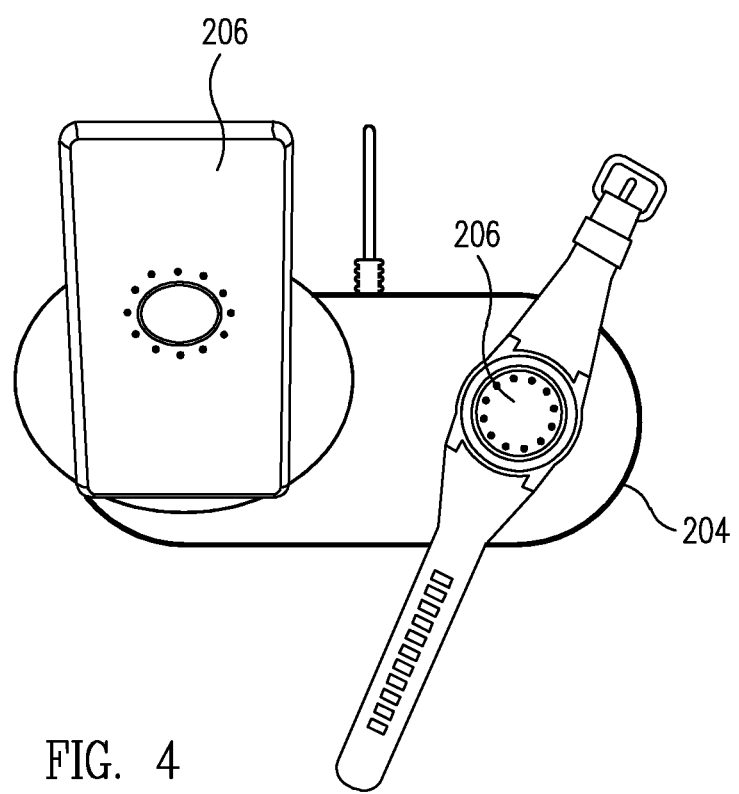
FIG. 4 illustrates charging of two receiver devices with a wireless power transmitter.

FIGS. 3 and 4 illustrate configurations of surface areas 204 for charging multiple receivers 206. In FIG. 3, both receivers 206 are smart phones. In FIG. 4, one receiver 206 is a smart phone and one receiver 206 is a watch. Surface area 204 are shaped to handle the charging devices. In general, embodiments of the present disclosure can be used to provide a charging area of sufficient size to accommodate more than two receivers.

Attempts to solve the problems of charging multiple PRxs 206 with PTx 200 has been attempted without success. In a first method, the goal can at least be partially achieved by using a single large expensive Micro Processor in PTx assembly 208 to manage all of the plurality of coils 202 (6 coils in the example here). However, the Micro Processor used in this attempt must have sufficient processing capabilities to manage all of the coils. Further, the Micro Processor firmware team must have sufficient skill to intercept and receive two or more interleaved asynchronous ASK communication channels, which is a daunting task. If these two conditions are not met, then lost packets can result from interference between ASK modulated transmissions. The requirements of an expensive microprocessor and highly skilled teams results in this first method being impractical to implement.

A second potential method for achieving these goals is to use a split ferrite with the plurality of coils 202 to eliminate ASK communication cross-talk across the ferrite. This solution is included as part of the WPC specification. Further, this solution utilizes dual independent PTx ICs to eliminate communication issues inherent in the first method described above. However, the second method fails to achieve end user goal of continuous placement freedom for charging multiple wireless power receivers. In particular, with this solution a PRx 206 cannot be placed on the coil pad in such a way as to span the split in the ferrite 210.

Figure 5A:
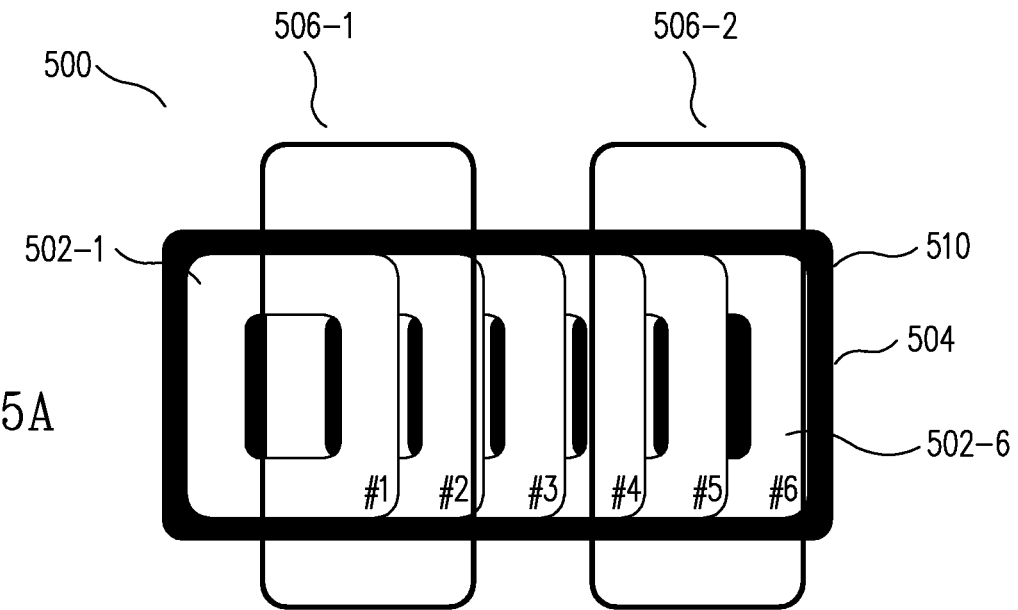
FIGS. 5A and 5B illustrate a wireless power transmitter according to some embodiments.
Figure 5B:
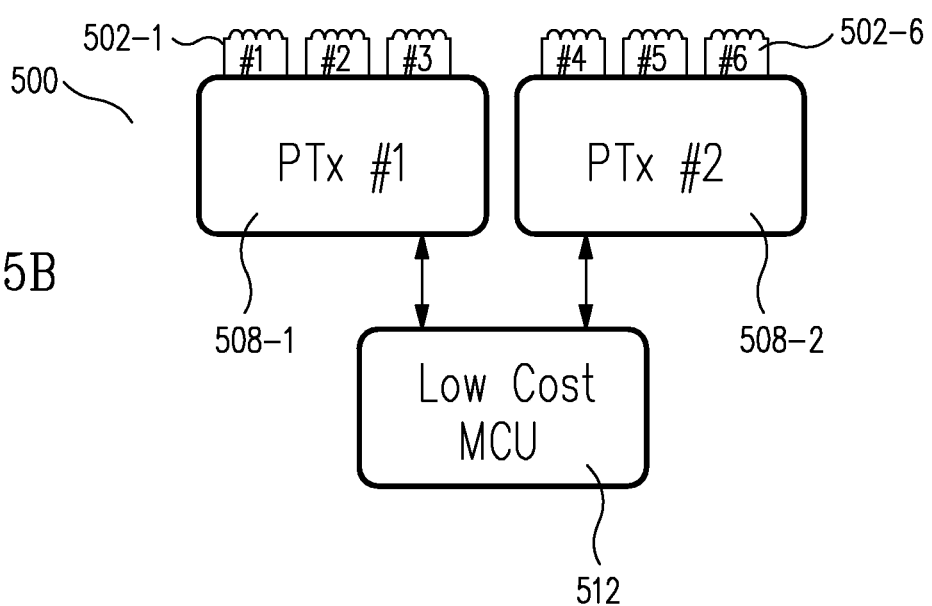

FIGS. 5A and 5B illustrate an example wireless power transmitter 500 according to some embodiments of the present disclosure. As illustrated in FIGS. 5A and 5B, PTx 500 includes a plurality of transmission coils 502 (coils 502-1 through 502-6 are illustrated) arranged to span an area 504. Area 504 includes a continuous ferrite 510 that underlies and magnetically couples all of transmit coils 502-1 through 502-6. In the particular example illustrated in FIGS. 5A and 5B, six (6) transmission coils 502-1 through 502-6 are arranged across area 504. The transmission coils 502-1 through 502-6 can be labeled coil #1 through coil #N, where N is the total number of coils that, in this example, is six. In general, N can be any integer.

As is illustrated in FIG. 5B, wireless power transmitter 500 includes a plurality of local power controllers, of which PTx #1 508-1 and PTx #2 508-2 are illustrated. Local power controller PTx #1 508-1 is coupled to drive a first subset of the plurality of transmission coils 502 (transmission coils 502-1 through 502-3) while local power controller PTx #2 508-2 is coupled to drive a different subset of the plurality of transmission coils 502 (502-4 through 502-6). In general, there may be local power controllers PTx #1 508-1 through PTx #K 508-K, each of which drives individual ones of coil #1 502-1 through transmission coil #N 502-N. Consequently, each of the plurality of coils 502 is driven by one of the plurality of local power controllers PTx #1 through PTx #K, PTx #1 508-1 and PTx #2 508-2 being illustrated in this example.

The plurality of local power controllers PTx #1 through PTx #K (PTx 508-1 and PTx 508-2) are controlled by a microcontroller unit (MCU) 512. MCU 512 executes instruction to direct the operation of local power controllers 508-1 and 508-K while each of local power controllers 508-1 and 508-K execute instructions for driving the coils 502-1 through 502-N that are coupled to it and receive ASK signals from the activated coils 502 coupled to it.

Wireless power transmitter 500 illustrates an embodiment with a low cost MCU 512 and a plurality of local power controllers 508, of which local power controllers 508-1 and 508-2 are illustrated. MCU 512 execute a control algorithm for supplying wireless power through the plurality of coils 502-1 through 502-N and receive ASK modulated signals from multiple receivers 506 positioned over the plurality of coils 502. The algorithms executed in MCU 512 can be relatively simple as described in further detail below. Consequently, MCU 512 can be a low-cost processor and need not be a powerful and expensive processor.

The Low Cost MCU 512 can be simple to program and provides sequencing control of local power controllers PTx #1 508-1 and PTx #2 508-2. In general, MCU 512 provides sequencing control for each of a plurality of local power controllers 508-1 and 508-2. The sequencing control of the plurality of local power controllers 508-1 and 508-2 provides for coil lockout (i.e. coil de-activation) to prevent detrimental ASK communication crosstalk. Meanwhile, each of local power controllers 508-1 and 508-2 remain optimized for single channel ASK communication with a corresponding coupled receiver PRx 506.

In particular, MCU 512 executes instructions that include a Blanking Algorithm that prevents certain ones of transmission coils 502 from being activated. The combination of hardware and software arbitration techniques keeps the requirements for supervisory MCU 512 to a minimal level. The algorithm utilizes active coil, signal levels, and other parameters as needed to determine active coil configurations. Based upon parameters, the algorithm executed by MCU 512 commands coil utilization to prevent detrimental crosstalk or other poor user experiences that are due to flux coupling while providing efficient power transmission to multiple receivers 506. Timing of ping signals further reduces detrimental crosstalk between coils. Active coil positions can be used to determine the optimal power transfer level which will not result in detrimental crosstalk. In particular, the blanking algorithm can de-activate coils adjacent to active coils. In some embodiments, multiple adjacent coils next to active coils may be de-activated to further isolate the active coils. Further, coils that are selected for detection of new receivers can be operated in a sequence that allows for efficient operation.

Figure 6A:
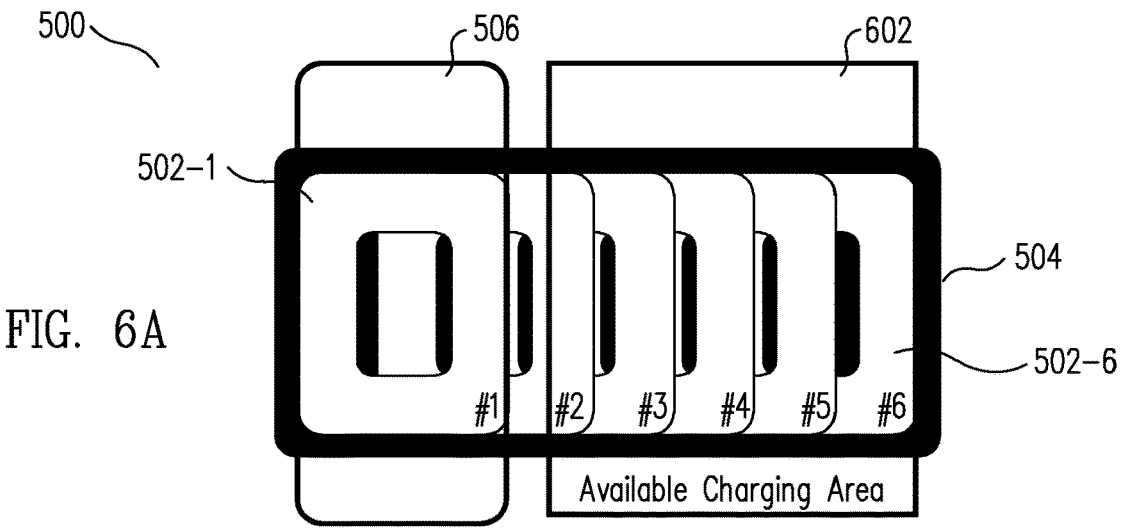
FIGS. 6A and 6B illustrate operation of the wireless power transmitter as illustrated in FIGS. 5A and 5B.
Figure 6B:
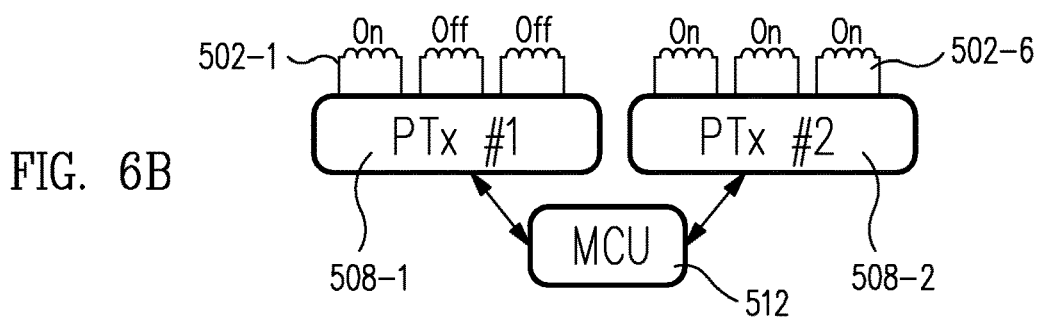
Figure 7A:
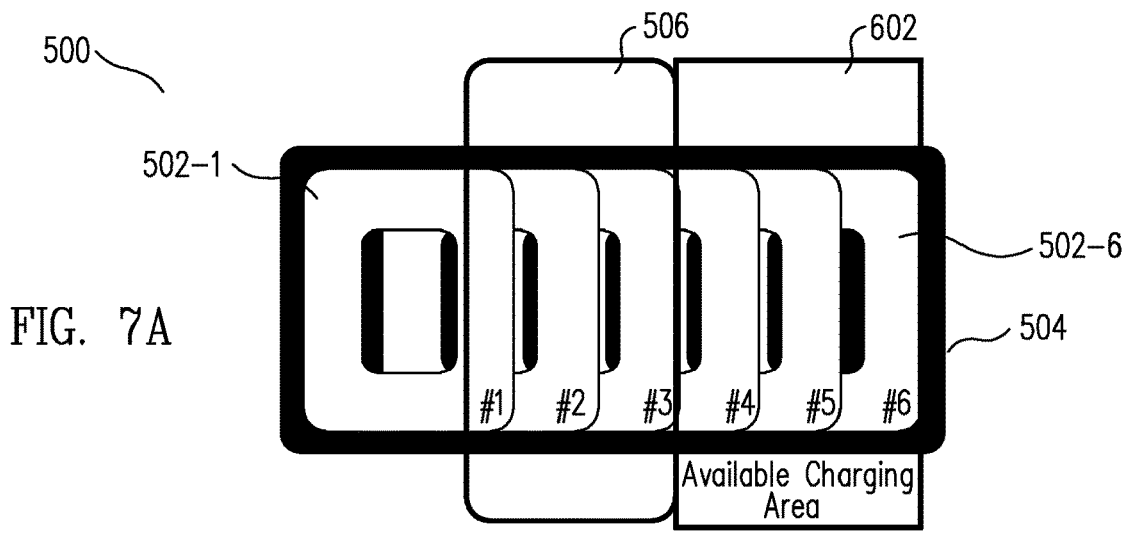
FIGS. 7A and 7B illustrate operation of the wireless power transmitter as illustrated in FIGS. 5A and 5B.
Figure 7B:
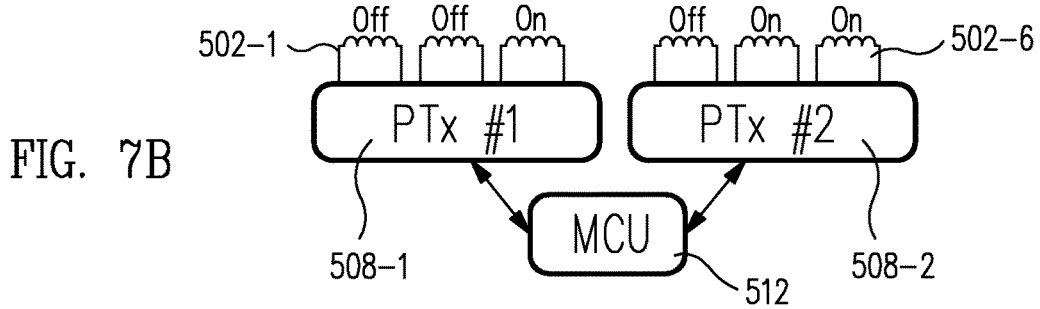

FIGS. 6A and 6B along with FIGS. 7A and 7B further illustrate examples of the operation of wireless power transmitter 500, and in particular the operation of MCU 512 according to some embodiments. MCU 512 executes instructions to control coil operation states. MCU 512 commands local power controllers PTx #1 508-1 and PTx #2 508-2 to look for PRx Devices 506 (via a "Ping"), for example on specific coils (e.g.: PTx1.1 (coil #1 502-1), PTx2.6 (coil #6 502-6), etc.) that are separated so as to not provide interference.

In accordance with some embodiments, a single local power controller PTx 508 only communicate with a single PRx 506. In other words, only one coil 502 attached to each local power controller PTx 508 is active at any given time in response to presence of a PRx 506. As illustrated in FIGS. 5A and 5B, one of transmission coils 502-1 through 502-3 coupled to local power controller PTx 508-1 and one of coils 502-4 through 502-6 coupled to local power controller PTx #2 508-2 are activated at any given time. Further, the algorithm is arranged such that MCU 512 does not command simultaneous "Pings" on coils adjacent to currently active coils. This algorithm easily prevents ASK corruption due to flux linkage between different receivers.

MCU 512 records when a coil detects a PRx 506 and the strength of the detection event. Consequently, the algorithm allows MCU 512 to choose the optimal coil for wireless power transfer based on the detection event strength. Further, since only one of the coils is activated, single-channel ASK communication can occur without interference. MCU 512 commands local power controllers PTx 508-1 and PTx 508-2 to activate a power transfer as determined by the algorithm.

As discussed above, MCU 512 does not command detection pings on coils adjacent to an active coil 502. For example, if transmission coil 502-3 is active (as illustrated in FIGS. 7A and 7B), transmission coil 502-4 is never commanded to "Ping." For more sensitive PRx devices, transmission coil 502-5 may also be turned off. In some embodiments, MCU 512 may set reduced power levels based upon which of coils 502 are active and whether or not a failed ASK demodulation event has been detected. Cross talk worsens at higher power levels if active coils are close together.

FIGS. 6A and 6B and FIGS. 7A and 7B illustrate operation according to the above set of guidelines. As shown in FIGS. 6A and 6B, a wireless power receiver 506 is positioned over transmission coil 502-1. MCU 512 then directs local power controller PTx #1 508-1 to turn on coil 502-1 and to turn off coils 502-2 and 502-3 to transfer power to receiver 506. This leaves the area 602 available to accommodate another wireless power receiver 506. Consequently, MCU 512 directs local power controller PTx #2 508-2 to turn on coils 502-4 through 502-6 to sense placement of a second receiver 506 in that area (area 602) (usually by providing sequential pings on those coils). As discussed above, the pings are provided on coils that are well spaced from the active coil (transmission coil 502-1) to prevent ASK cross-talk between transmissions from PRx 506 and a second receiver placed on available charging area 602.

FIGS. 7A and 7B illustrate a situation where wireless power receiver 506 is placed over transmission coil 502-3, leaving a reduced available charging area 602. In this situation, MCU 512 directs local power controller PTx #1 508-1 to turn off transmission coils 502-1 and 502-2 and turn on transmission coil 502-3. MCU 512 also directs local power controller PTx #2 508-2 to turn off transmission coil 502-4 because it is next to the active transmission coil 502-3 and turn on transmission coils 502-5 and 502-6 to detect presence of another wireless power receiver 506 in available charging area 602.

Figure 8A:
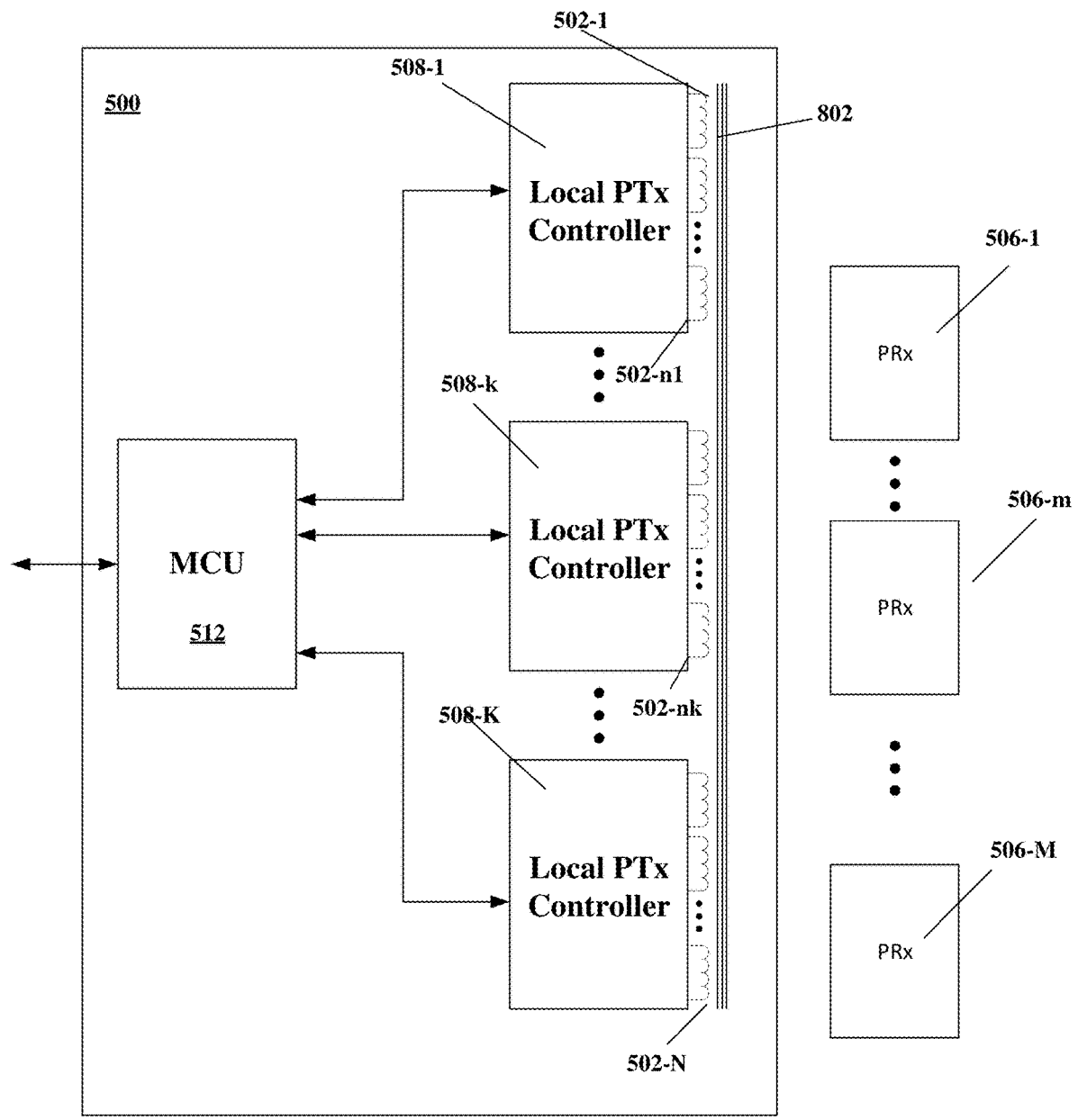
FIGS. 8A, 8B, and 8C illustrates an example of a wireless power transmitter according to some embodiments.

FIG. 8A illustrates a generalized embodiment of wireless power transmitter 500 according to this disclosure. As is illustrated in FIG. 8A, wireless power transmitter 500 includes an MCU 512, local power controllers 508-1 through 508-K, and transmission coils 502-1 through 502-N. MCU 512 is coupled to each of local power controllers 508-1 through 508-K, where K is at least two (2), to provide instructions to and receive data from each of local power controllers 508-1 through 508-K.

Each of local power controllers 508-1 through 508-K is coupled to a subset of transmission coils 502-1 through 502-N. Each subset of transmission coils 502-1 through 502-N can include at least two of transmission coils 502-1 through 502-N. Each of transmission coils 502-1 through 502-N is coupled to one of local power controllers 508-1 through 508-K. Consequently, as illustrated in FIG. 8A, transmit coils 502-1 through 502-$n1$ are coupled to local power controllers 508-1, transmission coils 502-$n$(k−1)+1 to 502-$nk$ are coupled to local power controllers 508-$k$, and transmission coils 502-$n$(K−1)+1 to 502-N are coupled to local power controllers 508-K.

As discussed above, transmission coils 502-1 through 502-N are spatially arranged to span an area 504. Further, transmission coils 502-1 through 502-N are magnetically coupled with a ferrite 802 that also spans area 504. As is illustrated in FIG. 8A, one or more receivers PRx 506 are positioned relative to the multiple transmission coils 502-1 through 502-N.

Figure 8B:
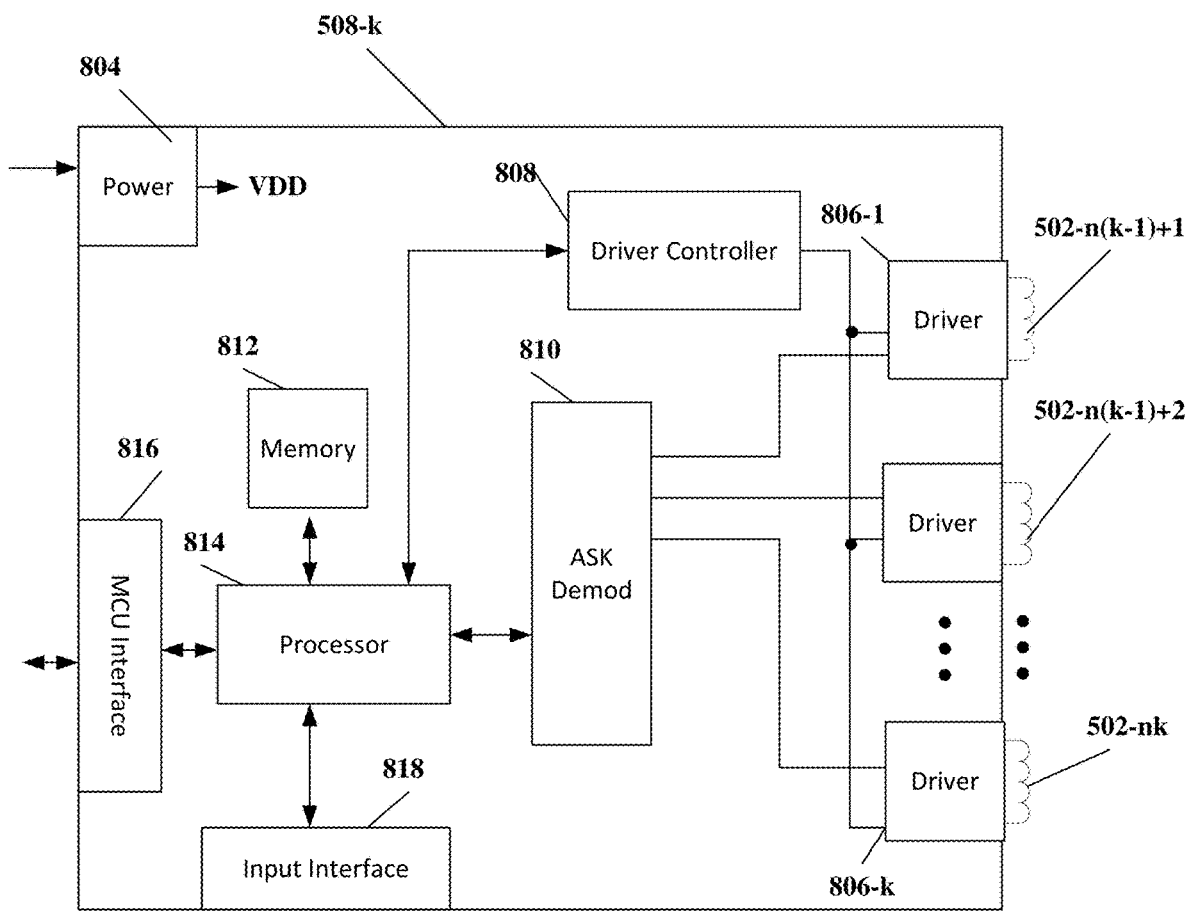

FIG. 8B illustrates an example block diagram of a local power controller 508-$k$, which is one of local power controllers 508-1 through 508-K as illustrated in FIG. 8A. As illustrated in FIG. 8B, local power controllers 508-$k$ is coupled to a subset of transmission coils 506-1 through 506-N. In particular, local power controllers 508-$k$ is coupled to k transmission coils that are labeled coil 502-$n$ (k−1)+1 to coil 502-$nk$. In particular, the number of coils k is greater than two. In the example illustrated above with reference to FIGS. 5A and 5B k is 3. In some embodiments, the number of coils for each of local power controllers 508-$k$ can be the same or can differ between power controllers.

As is illustrated in FIG. 8B, local power controller 508-$k$ includes k drivers 806-1 through 806-$k$ to drive the k transmission coils 502-$n$(k−1)+1 to 502-$nk$. Each of drivers 806-1 through 806-$k$ drive current through the corresponding one transmission coils 502-$n$(k−1)+1 to 502-$nk$, respectively, in response to signals from driver controller 808. As has been discussed above, one or more of drivers 806-1 through 806-$k$ can be activated to drive the corresponding one of transmission coils 502-$n$(k−1)+1 to 502-$nk$.

Drive controller 808 provides signals to each of drivers 806-1 through 806-$k$. The signals indicated whether or not each of drivers 806-1 through 806-$k$ are active (i.e. providing power to its corresponding transmission coil) or inactive (i.e. turning off its corresponding transmission coil). In some embodiments, controller 808 may include a half-bridge or full-bridge inverter that provides the power signal to each of drivers 806-1 through 806-$k$ at a particular frequency and particular power level. In some embodiments, each of drivers 806-1 through 806-$k$ can include a half-bridge or full-bridge inverter to individually drive the corresponding one of transmission coils 502-$n$(k−1)+1 to 502-$nk$, respectively. Further, controller 808 may provide FSK modulation to provide communications from transmitter 500 to corresponding ones of receivers 506.

Each of drivers 806-1 through 806-$k$ provides a wireless power signal from the corresponding one of transmission coils 502-$n$(k−1)+1 through 502-$nk$ to driver controller 808 and to ASK demodulator 810. Driver controller 808 and ASK demodulator are coupled to a processor 814. ASK demodulator 810 monitors the wireless power signal on the active transmission coils to detect and demodulate amplitude modulations on the wireless power signal. The digitized signal is then provided to processor 814.

Processor 814 is configured to execute instructions that operate local power controller 508-$k$. In particular, processor 814 executes instructions to activate or deactivate individual ones of drivers 806-1 through 806-$k$ for wireless power transfer and to activate or deactivate individual ones of drivers 806-1 through 806-$k$ for providing pings for detection of receivers that are placed in close proximity to one or more of transmit coils 502-$n$(k−1)+1 to 502-$nk$. Processor 814 may further execute instructions to control wireless power transfer through one of drivers 806-1 through 806-$k$ by controlling the frequency and power levels of the transfer. The instructions that are executed by processor 814 are stored in memory 812.

Processor 814 can be any processing circuit capable of executing instructions to perform the functions described here. In some embodiments, processor 814 can include microprocessors, microcomputers, microcontrollers, application specific integrated circuits (ASIC), digital signal processors, and/or other digital or analog circuits for performing these functions. Memory 812 can include both volatile and non-volatile data storage to store data and instructions for processor 814.

As is illustrated in FIG. 8B, processor 814 can be coupled to a MCU interface 816 for communications with MCU 512 as discussed above. Additionally, other interfaces 818 can also be coupled to processor 814. Interfaces 816 and 818 can include, for example, standard interfaces (e.g., I2C, GPIO, USB, or other standards) or can be a custom interface for this application. In particular, local power controller 508-$k$ receives instructions and provides data with MCU 512 through MCU interface 816 and may provide user data and a user interface through interface 818.

As is further illustrated in FIG. 8B, local power controller 508-$k$ can include a power source 804 that receives external power and provides voltage levels to drive controller 808, drivers 806-1 through 806-$k$. As an example, power source 804 may receive power from an external source (e.g. 110V AC) and provides voltages to components throughout local power controller 508-$k$.

Figure 8C:
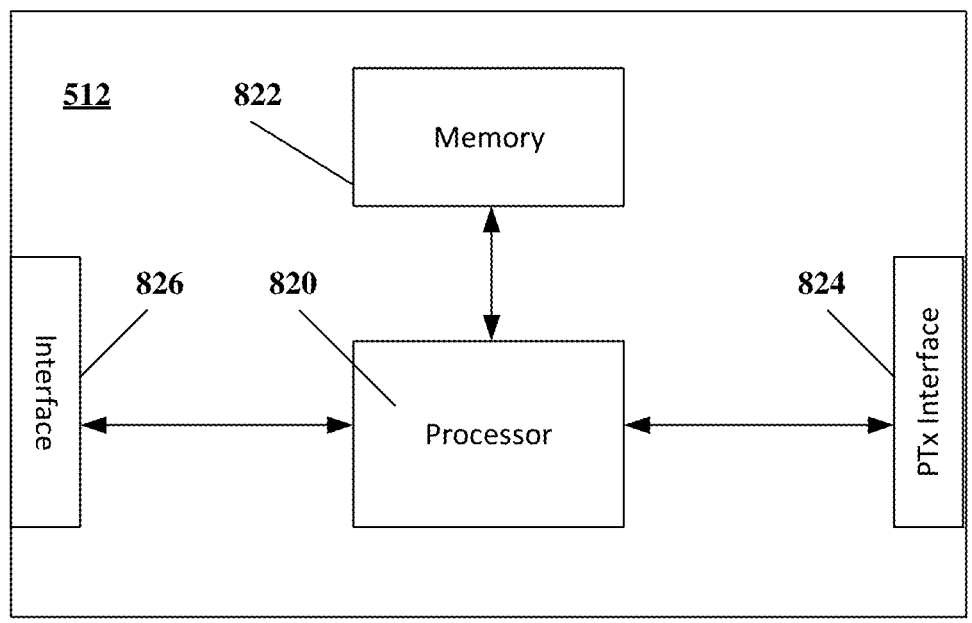

FIG. 8C illustrates an example of MCU 512. As illustrated in FIG. 8C, MCU 512 includes a processor 820 and a memory 822. Processor 820 can include microprocessors, microcomputers, microcontrollers, application specific integrated circuits (ASIC), digital signal processors, and/or other digital or analog circuits. Processor 820 can execute instructions that are stored in memory 822 and is configured to perform the functions described in this disclosure. Memory 812 can include both volatile and non-volatile data storage to store data and instructions for processor 814.

As is further illustrated in FIG. 8C, processor 820 can be coupled to a PTx interface 824 for communications with each of local power controller 508-1 through 508-K as discussed above. Additionally, other interfaces 826 can also be coupled to processor 820. Interfaces 824 and 826 can include, for example, standard interfaces (e.g., I2C, GPIO, USB, or other standards) or can be a custom interface for this application. In particular, MCU 512 provides instructions to and receives data from each of local power controllers 508-1 through 508-K through PTx interface 824 and may provide user data and a user interface through interface 826.

Figure 9:
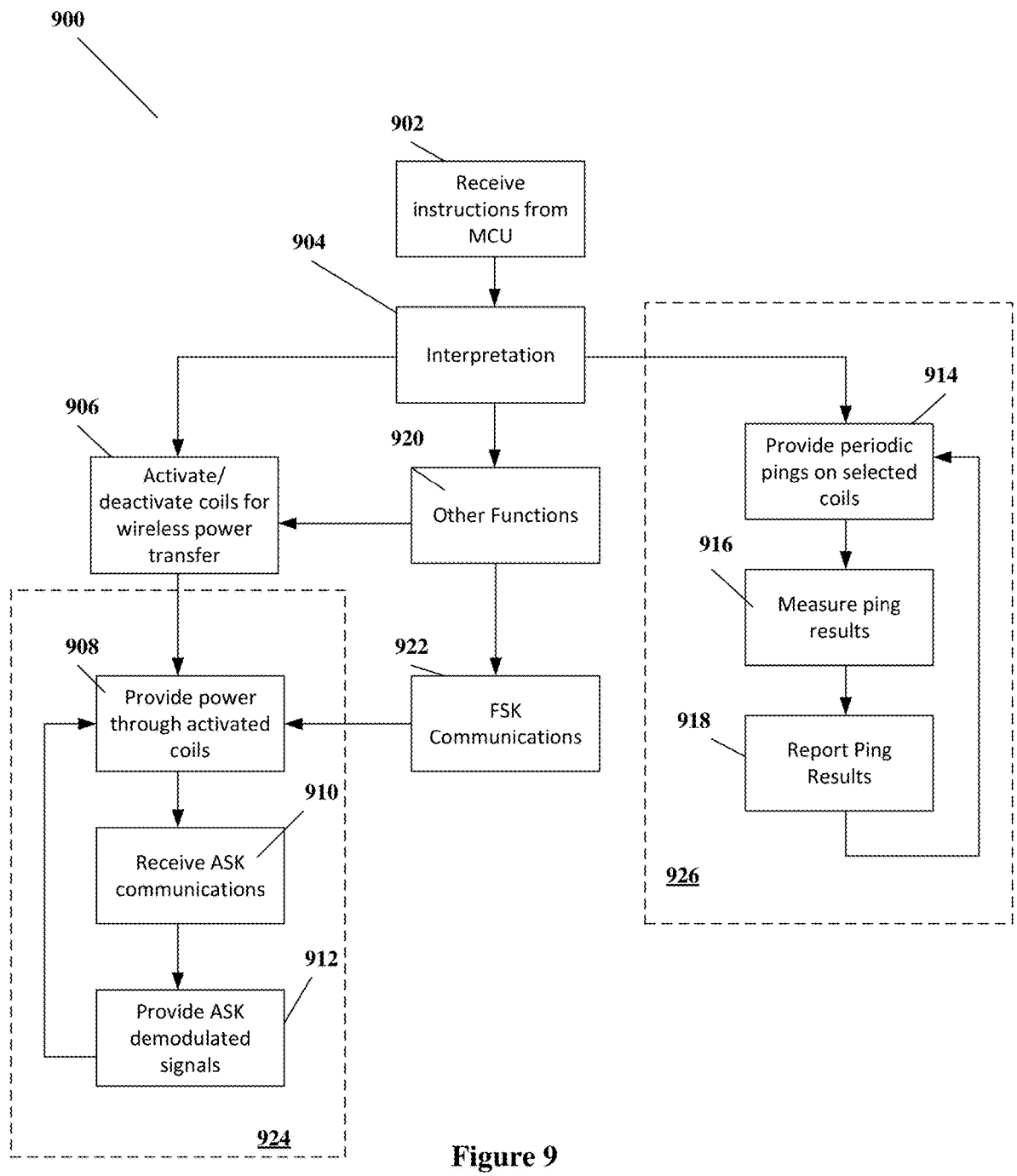
FIG. 9 illustrates an example operation of a local power controller according to some embodiments.

FIG. 9 illustrates an example of a method 900 for operation local power controller 508-$k$ according to some embodiments. Method 900 represents example instructions executed by processor 814 for operation of local power controller 508-$k$. As illustrated in FIG. 9, processor 814 operates two parallel loops: Wireless power loop 924 and receiver detection loop 926. Wireless power loop 924 provides wireless power through activated transmission coils. Receiver detection loop 926 can use selected ones of transmission coils 502-$n(k-1)+1$ to 502-$nk$ to detect the presence of a receiver.

As illustrated in FIG. 9, wireless power loop 924 includes providing power through activated coils in step 908. In some embodiments, once one of transmission coils 502-$n(k-1)+1$ through 502-$nk$ has been activated for transmission of wireless power to a detected receiver, then all of the remaining transmission coils 502-$n(k-1)+1$ through 502-$nk$ are de-activated as discussed below. Further, wireless power loop 924 includes step 910 where an ASK communications is detected and demodulated by ASK demodulation 810 and received by processor 814. When an ASK communication is received in processor 814, the ASK communication is forwarded to the MCU 512 in step 912. Wireless power loop 924 operates so long as a coil has been activated for wireless power transfer from local power controller 508-$k$.

As is further illustrated in FIG. 9, receiver detection loop 926 can provide periodic pings through selected ones of transmission coils 502-$n(k-1)+1$ to 502-$nk$ in step 914. In step 916, the ping results are obtained and provided to processor 814. In some embodiments, each of the selected transmission coils is pinged one at a time and the response detected and recorded. In step 918, the ping results are forwarded to MCU 512. In particular, the ping results may indicate which of the selected transmission coils receive signals indicating detection of a receiver and the signal strength of that detection.

In some embodiments, only one of wireless power transmission loop 924 and receiver detection loop 926 is activated in response to signals from MCU 512. Upon startup of wireless power transmitter 500, wireless power transmission loop 924 and receiver detection loop 926 are both inactive as there are no activated coils for wireless power transmission or selected coils for performing receiver detection. In step 902 of method 900, instructions are receiver from MCU 512. The instructions received from MCU 512 can include a mapping of the state of each of transmission coils 502-1 through 502-N. The state of each transmission coil 502 can be one of active (providing wireless power), de-active (OFF), or selected (designated for pinging to detect additional receivers).

In step 904, those instructions are interpreted. Upon startup, for example, MCU 512 may provide instructions to select coils from the k transmission coils coupled with local power controller 508-$k$ and initiates receiver detection loop 926. Alternatively, the instructions received from MCU 512 may deselect some or all of the previously selected transmission coils to use in receiver detection 926. For example, MCU 512 provides a coil map that indicates active coils, de-active coils (such as those adjacent to active coils), or selected coils.

The instructions received from MCU 512 may further includes instructions to activate or deactivate one or more of the k transmission coils for wireless power transmission according to the state designation. While one of the k transmission coils is activated, then wireless power transfer loop 924 can be executed to transfer power to a receiver 506. Other instructions can be performed in step 920. These other instructions may be, for example, setting power levels for wireless power transfer in wireless power transfer loop 924, providing an FSK communications in step 922 through an active coil in wireless power transfer loop 924, or other power transfer related function.

Figure 10:
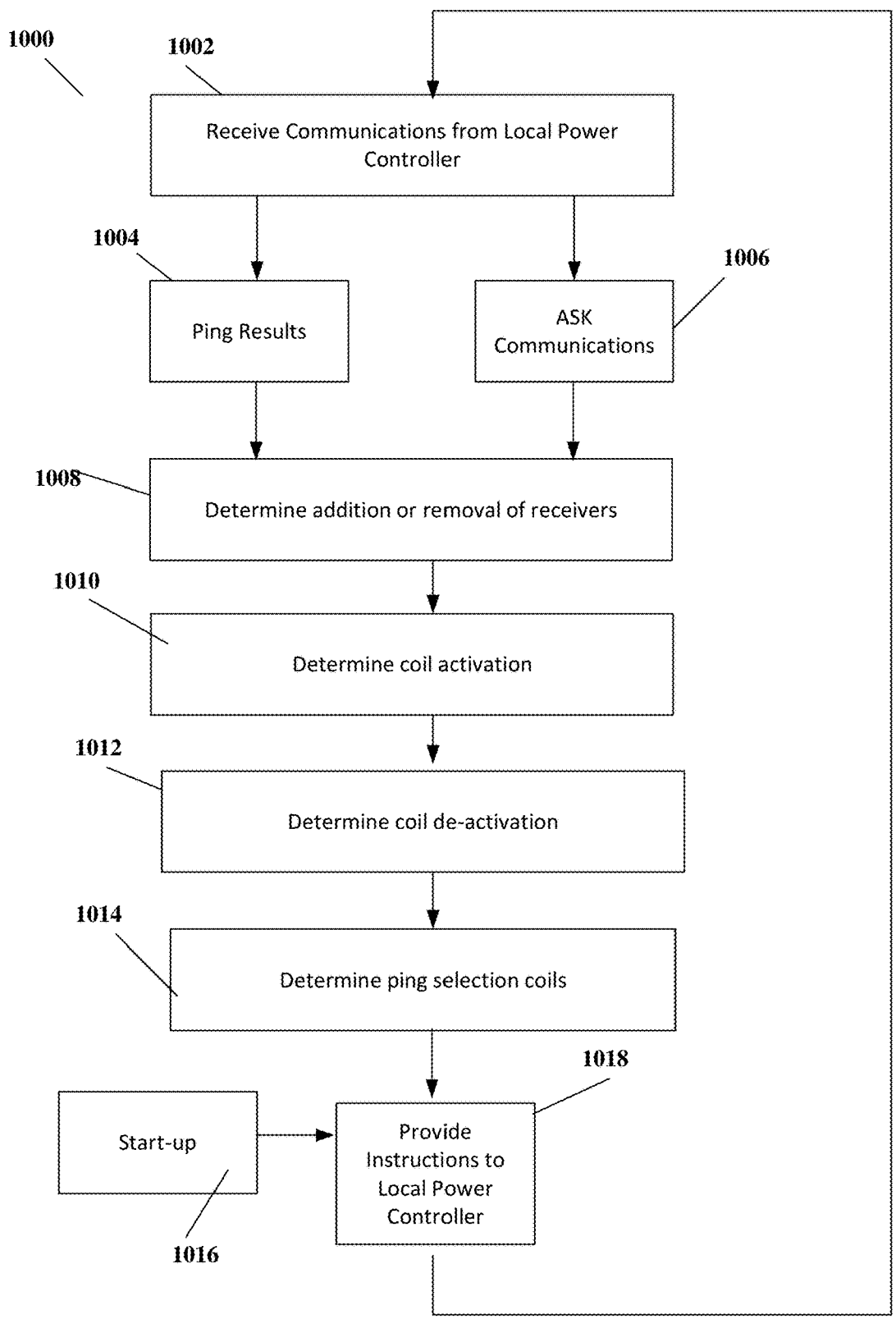
FIG. 10 illustrates an example operation of a MCU according to some embodiments.

FIG. 10 illustrates an example method 1000 for the operation of MCU 512 according to some embodiments. As illustrated in FIG. 10, upon startup of wireless power transmitter 500 in step 1016, instructions to select transmission coils for providing pings to detect receivers 506 can be sent to local power controllers 508-1 through 508-K in step 1018. Consequently, at startup time, each of local power controllers 508-1 through 508-K are provided with selected coils whose state is designated to detect receivers 506 in instructions sent in step 1018. The selected coils may include all of transmission coils 502-1 through 502-N or a subset of transmission coils 502-1 through 502-N, for example on startup or when no receivers were previously detected. Method 1000 can then proceed to one of step 1002 to receive communications from local power controllers 508-1 through 508-K.

After startup, the communications received in step 1002 are ping results from each of the selected coils in local power controllers 508-1 through 508-K. In subsequent iterations, ASK communications may also be received from receivers 506 that have already been detected and where wireless power transfer has begun. In step 1004, ping results are received and the ping signal strengths from each of the selected coils is determined. These results for selected coils is forward to step 1008. Any ASK communications from receivers 506 that are already receiving power is also provided to step 1008.

In step 1008, a determination of whether a new receiver is detected or a previously engaged receiver has been removed. A new receiver is detected when a ping from one of the selected coils results in a return signal from the receiver. The strength of the return signal is indicative of the proximity of the receiver 506 to the pinged coil. The ping and the monitoring of the ping signal returned can be performed by driver controller 808 as illustrated in FIG. 8B. Consequently, each of local power controllers 508-1 through 508-K reports the ping results for each of the selected coils attached to those local power controllers 508-1 through 508-K.

In addition to the ping results from selected coils, ASK communication packets received from receivers that are currently receiving wireless power from active coils can also be received. The ASK communication packets can include requests from the receivers to increase or decrease power levels, indication that the receiver is fully charged, error codes indicating dropped ASK communication packets, or other information. All of this information can be used to determine power levels or error conditions in step 1008. In some embodiments, further reporting data can be received from local power controllers 508-1 through 508-K which may be used to determine that a receiver is present or has been removed.

In step 1010 coil activation is determined. In some embodiments, during step 1010, some of the transmission coils 502 have already been activated. In this step, if a new receiver has been detected on coils that have been selected for receiver detection, one of selected transmission coils 502 can be activated to wirelessly transfer power to the newly detected receiver 506. In that case, the transmission coil 502 that has returned the strongest ping signal can be chosen to be activated. Those coils that have been activated in a previous iteration remain activated until it is detected that the corresponding receiver has been removed. This detection can be performed based on ASK communications or based on parameters monitored by driver controller 808 in each of local power controllers 808-k to indicate that an activated coil is no longer transmitting power to a receiver. In that case, in step 1008 the coil a mapping of active transmission coils can be formed.

In step 1012, after activated coils is determined in step 1010, deactivated coils are determined. In some embodiments, in order to prevent ASK cross communication, and due to lack of resources to accommodate multiple ASK communications, only one transmission coil 502 attached to any given local power controllers 508-1 through 508-K may be activated, the remainder will be de-activated. Further, coils that are adjacent to each active coil are de-activated so that they are not used for receiver location and not used for wireless power transfer. Consequently, at the end of step 1012, a mapping of activated coil and corresponding de-activated coils is determined.

In step 1014, each of the transmission coils 502-1 through 502-N that have not been designated as activated or de-activated are selected for receiver detection. These selected coils can provide pings as discussed above to detect new receivers that are brought into proximity with the transmission coils 502. Consequently, step 1018 the updated mapping is transmitted to local power controllers 508-1 through 508-K.

In the example illustrated in FIGS. 5A and 5B, for example, receiver 506-1 is best centered over transmission coil 502-2 and second receiver 506-2 is positioned over transmission coil 502-5. Therefore, transmission coil 502-2 attached to local power controller 508-1 and transmission coil 502-5 attached to local power controller 508-2 can be designated as activate in step 1010. Consequently, in FIGS. 5A and 5B, transmission coils 502-1 and 502-3 coupled to local power controller 508-1 are designated as de-active in step 1012 and transmission coils 502-4 and 502-6 coupled to local power controller 508-2 are designated as de-active in step 1012 because they are adjacent to transmission coils designated as active. As there are no remaining transmission coils that have not been designated as active or de-active, in step 1014 no transmission coils are selected for receiver detection. As illustrated in the configuration of FIGS. 6A and 6B, a single receiver 506 is positioned over transmission coil 502-1. As illustrated in the configuration of FIGS. 7A and 7B, the single receiver 506 is positioned over transmission coil 502-3. The determination of which coil the receiver is over can be determined by the strength of the ping signal or by other methods (e.g., an x-y position detection system can be used). The following table illustrates that state designations for the receiver configurations illustrated in FIGS. 5A, 5B, 6A, 6B, 7A, and 7B. In particular, the activation (ON) or de-activation (OFF) designation of each coil is determined with respect to detection of a receiver 506 in a position that would allow the most efficiency of wireless power transfer with that coil. Further, once a coil is activated (i.e. designated as ON), then the remaining coils associated with that local power controller 508 are designated as de-activated (OFF) and adjacent coils to the activated coils are designated as de-activated. Any remaining transmission coils are selected to provide a ping.

| Configuration | Coil 502-1 | Coil 502-2 | Coil 502-3 | Coil 502-4 | Coil 502-5 | Coil 502-6 |
|---|---|---|---|---|---|---|
| FIGS. 5A, 5B | OFF | ON | OFF | OFF | ON | OFF |
| FIGS. 6A, 6B | ON | OFF | OFF | PING | PING | PING |
| FIGS. 7A, 7B | OFF | OFF | ON | Off | PING | PING |

In step 1014, those coils that are not designated as active in step 1010 or de-active in step 1012 can be selected for receiver detection, or as PING coils, in step 1014. These coils, then, underlie an area where another receiver can be placed (e.g., areas 602 illustrated in FIGS. 6A and 7A).

Consequently, as discussed above, steps 1010, 1012, and 1014 determine the state designations of each of coils 502-1 through 502-N as active (ON), de-activated (OFF), or selected for receiver detection (PING). The decisions on state designation can be made according to the following factors:
  Currently activated coils 502 and de-activated coils 502 remain in those state designations unless a determination that the receiver(s) associated with the activated coils 502 have been removed;
  If the receiver has been removed, the associated activated coils and de-activated coils become selected for receiver detection (PING);
  Determine receiver position over a particular coil 502 based on ping signal levels and other parameters and activating the particular coil 502;
  Blanking coils connected to the same local power controller 508 by deactivating those transmission coils 502;
  Blanking coils adjacent to the active coils by de-activating those coils, if they have not already been de-activated; and Designating the coils 502 that have not already been designated as active or have been de-activated as selected for receiver detection (PING).

In some embodiments, for each of coils 502 that have been designated as active, the power levels can be adjusted. This adjustment can be provided in response to ASK communications requesting power level changes or can be lowered in response to ASK communications indicating lost ASK packet communications. The timing and placement of PING designated coils can also be adjusted to prevent poor user experiences. Further, as discussed above, no coils adjacent to activated coils are used for receiver detection. In some embodiments, more than one coils adjacent to an active coil can be designated as de-active (e.g., if transmission coil 502-$j$ is designated as active, then coils 502-($j$–1) to 502-($j$–i) and coils 502-($j$+1) to 502-($j$+i), where i is greater than 1 are de-activated).

Consequently, in steps 1010, 1012, and 1014, state designations for each of the plurality of transmission coils is updated according to whether the selected transmission coils have detected a new receiver or whether, through ASK communications or other parameters, a current receiver has been removed. If a new receiver is detected, then a transmission coil that had previously been designated as selected for designation of receivers is re-designated as active based on the ping signal. If a current receiver has been removed, then the transmission coil that was designated as activate to provide wireless power to that current receiver is then de-designated as active. For each of the then active transmission coils, one or more coils adjacent to the active transmission coils are then designated as de-active. Those that are not designated as active or de-active are then selected for detection of receivers.

Once the coil state designations have been determined, then method 1000 proceeds to step 1018 where the appropriate instructions are transmitted to each of local power controllers 508-1 through 508-K to institute those state designations. As discussed above, local power controllers 508-1 through 508-K operate each of coils 502-1 through 502-N in accordance with the instructions transmitted in step 1018. As discussed above, on startup, all of coils 502-1 through 502-N can be designated as PING and through the iterations illustrated in FIG. 10, coils are re-designated accordingly.

Consequently, embodiments as described above provide a method to achieve PRx 506 placement freedom over a continuous surface where Multiple PRx devices 506 can be charged over a continuous surface. Multiple local power controllers 508 are used to send power to the PRxs 506 where a supervisory MCU 512 controls each local power controller 508 for optimal performance for transfer of power and minimize the occurrence of ASK cross-talk.

As illustrated above, MCU 512 controls multiple local power controllers 308 where Coil performance is characterized to determine the optimal coil for a power transfer, PTx coils are activated, de-activated, or designated to detect receivers to prevent detrimental cross talk due to flux linkage. PTx coils 502 are turned on and off based on system characterization of state variable including but not limited to reported coil signal strengths, PRx type, and power transfer levels. Furthermore, time separation off ping signals prevents detrimental crosstalk between PTx/PRx systems. Furthermore, delivered power levels can be modulated to limit detrimental crosstalk. The deliver power level modulation magnitude is a function of the PRx device type and the coupling between active coils.

Embodiments of the invention described herein are not intended to be limiting of the invention. One skilled in the art will recognize that numerous variations and modifications within the scope of the present invention are possible. Consequently, the present invention is set forth in the following claims.

What is claimed is:

1. A wireless power transmitter, comprising:
   a plurality of transmission coils arranged to cover a charging area and coupled with a ferrite;
   a plurality of local power controllers, each of the plurality of local power controllers coupled to drive a subset of the plurality of transmission coils, each subset of the plurality of transmission coils including a plurality of the plurality of transmission coils; and
   a microcontroller unit (MCU) coupled to the plurality of local power controllers, the microcontroller unit including a MCU processor executing instructions to designate states of each of the plurality of transmission coils, the states including active, de-active, and selected for receiver detection, and executing instructions to transmit instructions to each of the plurality of local power controllers in accordance with the state designations.

2. The wireless power transmitter of claim 1, wherein the MCU further includes
   an MCU memory coupled to the MCU processor; and
   an MCU interface coupled to the processor, the MCU interface configured to communicate with each of the plurality of local power controllers.

3. The wireless power transmitter of claim 2, wherein the instructions to designate states of each of the plurality of transmission coils includes instructions to
   receive communications from one or more of the local power controllers;
   analyze the communications to determine presence of a new receiver or removal of a current receiver;
   if the new receiver is detected, then designate a transmission coil from one of the selected coils to active based on a ping signal strength; and
   if a current receiver has been removed, then de-activate the transmission coil that was active to accommodate the current receiver;
   for each active coil in the plurality of transmission coils, designate adjacent coils as de-active; and
   select each transmission coil that has not be designated as active or de-active for detection of receivers.

4. The wireless power transmitter of claim 3, wherein the instructions to analyze the communications includes determination of a power level associated with each transmission coil designated as active.

5. The wireless power transmitter of claim 4, wherein power of transmission coils designated as active is adjusted in response to an ASK communication from the receiver or in response to detection of a dropped ASK communications.

6. The wireless power transmitter of claim 3, wherein each of the plurality of local power controllers includes
   a plurality of drivers, each driver coupled to one of the subset of the plurality of transmission coils associated with the local power controller;
   a driver controller coupled to control each of the plurality of drivers;
   an ASK demodulator coupled to receive and demodulate amplitude shift keyed signals on each of the plurality of drivers;
   a coil driver processor coupled to the driver controller and the ASK demodulator;
   a driver memory coupled to the coil driver processor; and a driver interface configured to communication with the MCU interface.

7. The wireless power transmitter of claim 6, wherein the coil driver processor executes instructions to
receive instructions from the MCU;
configure each of the plurality of drivers according to the state of designation of each of the transmission coils coupled to the power local power controller;
if one of the transmission coils is designated as active, then provide wireless power through the active transmission coil and receive ASK modulated transmissions;
if any of the transmission coils is selected to detect receivers, provide pings and receive ping signals; and
transmit ping signals and ASK modulated transmissions to the MCU.

8. The wireless power transmitter of claim 1, wherein the designated states are configured such that only one transmission coil coupled to each of the plurality of local power controllers can be activated.

9. The wireless power transmitter of claim 8, wherein if one transmission coil coupled to one of the plurality of local power controllers is designated as active, then the remaining transmission coils coupled to the one of the plurality of local power controllers are designated as de-active.

10. The wireless power transmitter of claim 1, wherein for each transmission coil designated as active, adjoining transmission coils are designated as de-active.

11. The wireless power transmitter of claim 1, wherein transmission coils that are not designated as active or de-active are selected for receiver detection.

12. The wireless power transmitter of claim 1, wherein the plurality of transmission coils are arranged in an overlapping fashion to span the charging area.

13. A method of operating a microcontroller unit (MCU) in a power transmission system, comprising:
receiving communications from one or more of a plurality of local power controllers, each of the plurality of local power controllers coupled to drive a subset of a plurality of transmission coils, each subset of the plurality of transmission coils including a plurality of the plurality of transmission coils;
analyzing the communications to determine presence of a new receiver or removal of a current receiver;
designating a state of each of the plurality of transmission coils by
if a new receiver is detected, then designating a transmission coil from one of the selected coils to active based on a ping signal strength,
if a current receiver has been removed, then removing the transmission coil from active status to accommodate the current receiver and removing de-active coils associated with the coil from de-active status,
for each active coil in the plurality of transmission coils, designating adjacent coils as de-active, and
selecting each transmission coil that has not be designated as active or de-active for detection of receivers; and,
transmitting instructions to each of the plurality of local power controllers according to the state of each of the plurality of transmission coils.

14. The method of claim 13, wherein analyzing the communications includes determination of a power level associated with each transmission coil designated as active and wherein transmitting instructions includes providing power levels for each of the active transmission coils.

15. The method of claim 14, wherein power of transmission coils designated as active is adjusted in response to an ASK communication from the receiver or in response to detection of a dropped ASK communications.

16. The method of claim 13, wherein the designated states of the plurality of transmission coils are configured such that only one transmission coil coupled to each of the plurality of local power controllers can be activated.

17. The method of claim 16, wherein if one transmission coil coupled to one of the plurality of local power controllers is designated as active, then the remaining transmission coils coupled to the one of the plurality of local power controllers are designated as de-active.

18. A method of operating a local power controller, comprising:
receives instructions from a microcontroller unit (MCU), the instructions including state designations for a plurality of transmission coils that are coupled to a corresponding plurality of drivers in the local power controller;
configure each of the plurality of drivers according to the state of designation of each of the transmission coils;
if one of the transmission coils is designated as active, then providing wireless power through the active transmission coil and receiving ASK modulated transmissions from the transmission coil designated as active;
if any of the transmission coils is selected to detect receivers, provide pings and receive ping signals from the selected transmission coils; and
transmit ping signals and ASK modulated transmissions to the MCU.

19. The method of claim 18, wherein the instructions further include power levels for the active coil and further including setting power levels for the transmission of wireless power.

20. The method of claim 18, further including detection of removal of a receiver coil and transmitting signals indicating removal of the receiver coil.

21. The method of claim 18, wherein the designated states are configured such that only one transmission coil coupled to the local power controller can be activated.

22. The method of claim 21, wherein if one of the transmission coils coupled to the local power controller is designated as active, then the remaining transmission coils coupled to the local power controller are designated as de-active.

23. The method of claim 18, wherein for each transmission coil designated as active, adjoining transmission coils are designated as de-active.

24. The method of claim 18, wherein transmission coils that are not designated as active or de-active are selected for receiver detection.

25. A microcontroller unit (MCU) for wireless power transmission, comprising:
a processor;
a memory coupled to the processor; and
an interface coupled to the processor, the interface configured to communicate with each of a plurality of local power controllers, each of the plurality of local power controllers coupled to drive a subset of a plurality of transmission coils,
wherein the processor executes instructions to designate states of each of the plurality of transmission coils, the states including active, de-active, and selected for receiver detection, and executing instructions to transmit instructions to each of the plurality of local power controllers in accordance with the state designations.

26. The MCU of claim 25, wherein the instructions to designate states of each of the plurality of transmission coils includes instructions to
- receive communications from one or more of the plurality of local power controllers;
- analyze the communications to determine presence of a new receiver or removal of a current receiver;
- if the new receiver is detected, then designate a transmission coil from one of the selected coils to active based on a ping signal strength; and
- if a current receiver has been removed, then remove from active status the transmission coil that was active to accommodate the current receiver that was removed, and remove from de-active status those coils adjacent;
- for each remaining active coil in the plurality of transmission coils, designate adjacent coils as de-active; and
- select each transmission coil that has not be designated as active or de-active for detection of receivers.

27. A local power controller, comprising:
- a plurality of drivers, each driver coupled to a corresponding one of a plurality of transmission coils associated with the local power controller;
- a driver controller coupled to control each of the plurality of drivers;
- an ASK demodulator coupled to receive and demodulate amplitude shift keyed signals on each of the plurality of drivers;
- a coil driver processor coupled to the driver controller and the ASK demodulator;
- a driver memory coupled to the coil driver processor; and
- a driver interface configured to communication with a microcontroller unit (MCU),
wherein the coil driver processor executes instructions to
- receive instructions from the MCU, the instructions including designated states for each of the transmission coils associated with the local power controller;
- configure each of the plurality of drivers according to a state of designation of each of the transmission coils coupled to the local power controller;
- if one of the transmission coils is designated as active, then provide wireless power through the active transmission coil and receive ASK modulated transmissions;
- if any of the transmission coils is selected to detect receivers, provide pings and receive ping signals; and
- transmit ping signals and ASK modulated transmissions to the MCU.

28. The controller of claim 27, wherein the instructions from the MCU includes power levels for transmission coils that have been designated as active.

29. The controller of claim 27, wherein the designated states are configured such that only one transmission coil coupled to the local power controller can be activated.

30. The controller of claim 29, wherein if one transmission coil coupled to the local power controller is designated as active, then the remaining transmission coils coupled to the local power controller are designated as de-active.

31. The controller of claim 27, wherein for each transmission coil designated as active, adjoining transmission coils are designated as de-active.

32. The controller of claim 27, wherein transmission coils that are not designated as active or de-active are selected for receiver detection.

* * * * *